United States Patent [19]

Freiberg

[11] Patent Number: 4,744,090

[45] Date of Patent: May 10, 1988

[54] HIGH-EXTRACTION EFFICIENCY ANNULAR RESONATOR

[75] Inventor: Robert J. Freiberg, Mission Viejo, Calif.

[73] Assignee: TRW Inc., Redondo Beach, Calif.

[21] Appl. No.: 752,985

[22] Filed: Jul. 8, 1985

[51] Int. Cl.[4] .......................... H01S 3/083; H01S 3/08
[52] U.S. Cl. .......................... 372/94; 372/95; 372/99; 372/107; 372/108
[58] Field of Search .............. 372/94, 95, 92, 98, 372/99, 107, 108, 93

[56] References Cited

U.S. PATENT DOCUMENTS

| | | | |
|---|---|---|---|
| 3,969,688 | 7/1976 | Freiberg et al. | 372/95 |
| 4,164,366 | 8/1979 | Sziklas et al. | 372/95 |
| 4,170,405 | 10/1979 | Sziklas | 372/108 |
| 4,399,543 | 8/1983 | Oughstun | 372/94 |
| 4,514,850 | 4/1985 | Holmes et al. | 372/95 |

*Primary Examiner*—James W. Davie
*Assistant Examiner*—Georgia Y. Epps
*Attorney, Agent, or Firm*—Noel F. Heal; Thomas N. Giaccherini

[57] ABSTRACT

A standing-wave annular laser resonator providing high energy extraction efficiency and good beam quality without the need for polarization coatings. The resonator includes an axicon, a scraper mirror, and a rear mirror system. A critical feature of the configuration is that the axicon has an inner conical mirror of which the apex is offset from the usual position, such that a radial beam reflected from an outer conical mirror has one portion that bypasses the inner mirror without impinging on it. This portion of the radial beam is reflected back along an annular path and makes two more passes through an annular gain region before becoming available for outcoupling around the scraper mirror. The rear mirror system retroreflects and annular beam back on itself in inverted form, without introducing any polarization mixing. The rear mirror system may take the form of a conical mirror and a plane back mirror, or a concave retroreflecting cone, or a convexly curved conical mirror and a concavely curved back mirror.

16 Claims, 2 Drawing Sheets

HIGH-EXTRACTION EFFICIENCY ANNULAR RESONATOR

BACKGROUND OF THE INVENTION

This invention relates generally to lasers, and more particularly, to laser resonators of cylindrical or annular configuration. Obtaining high-power beams from conventional linear laser resonators poses almost insurmountable problems. The laser resonator must have a cavity length that is either impracticably large, or has to be made in a folded configuration that increases the number of mirrors required. Long cavity lengths can also result in degradation in beam quality, and such lasers are extremely sensitive to mirror alignment.

Another significant problem is that a conventional linear high-power chemical laser requires a linear flow of gases, which produces a corresponding linear accelerating force on the laser structure. In a well known form of a chemical laser, the principal chemical reaction is between fluorine and hydrogen, and produces excited hydrogen fluoride molecules and atomic hydrogen. Fluorine and hydrogen are typically injected at supersonic speeds, through nozzles into a resonant cavity, giving rise to the accelerating forces.

For these and other reasons, designers of high-power lasers have more recently shifted their attention to cylindrical or annular resonator configurations. Greater powers can be obtained more readily from cylindrical configurations, and the radial accelerating forces are distributed uniformly, and are therefore self-cancelling. However, the conventional linear laser with an unstable resonator has at least one important attribute. It provides inherently good mode control. Undesirable higher-order modes of operation of the laser are not present, and the laser therefore provides good beam quality. Cylindrical or annular lasers, although yielding higher powers, do not provide beams of intrinsicly good quality. If some of the power could be sacrificed, spatial filtering could be employed to remove unwanted higher-order modes of lasing, but spatial filtering is inefficient from a power standpoint.

Various designs and proposals have been advanced to seek, in effect, the annular analog of the conventional unstable linear laser resonator. The ideal annular laser resonator configuration would be one that combined the advantage of beam quality, which is inherent in the unstable linear resonator, with the advantages of high power and symmetry inherent in the annular configuration. However, as will be explained in more detail, annular laser configurations prior to this invention have been deficient in some important respects.

The common features of annular lasers are an annular gain region and an annular resonator. The principal requirement for the resonator is that it extract a large amount of power efficiently from the annular gain region, in such a manner that mode control, and therefore beam quality, are preserved.

The simplest annular resonator is the toric unstable resonator (TUR), which consists of two toric mirrors arranged at each end of the annular gain region. Since the toric optics have no single optic axis, there is no diffractive coupling in the azimuthal direction, and operation of the device is not satisfactory. Modifications to enhance mode control in the toric resonator have not been successful and the configuration has been largely discarded by investigators.

An annular resonator configuration known as the half-symmetric unstable resonator with internal axicon (HSURIA) was intended to provide the desired combination of advantages. It combines the principal features of the toric unstable resonator, but also includes an optical element known as an axicon to convert the annular beam to a compacted cylindrical one. One form of the axicon is known as a waxicon, named for its letter-W shape when viewed in cross-section. A waxicon is basically an arrangement of two approximately conical mirrors. A first, outer conical mirror with an internal reflective surface reflects the annular beam inwardly toward a second, inner conical mirror, concentric with the first and having an external reflective surface. A section taken through a waxicon shows the two conical mirrors in a letter-W configuration. The annular beam is reflected radially in toward the optical axis of the waxicon by the first conical mirror, and is then reflected in an axial direction by the second conical mirror, the effect being to compact the annular beam into a cylindrical one, directed back along the central axis of the original annular beam. The compacted beam impinges on a scraper mirror, which reflects a central portion of the beam back into the resonator optics, and allows an out-coupled portion of the compacted beam to pass. Instead of a waxicon, a reflaxicon may be used. A reflaxicon also has two concentric conical mirrors, but the inner one is in a reversed orientation as compared with the waxicon. In a sectional view of a reflaxicon, the two conical mirrors appear to be parallel, and the compacted cylindrical beam continues in the same direction as the original annular beam.

The basic HSURIA configuration includes a waxicon or reflaxicon element at one end of the annular gain region and a plane toric mirror at the other end of the gain region. The resonator cavity is formed by the waxicon or reflaxicon, the toric mirror, and the scraper mirror, and has the simplicity of its toric optics and a single optical axis in the so-called "compact leg," in which the cylindrical beam is propagated. However, the configuration also has some significant drawbacks.

Most importantly, the arrangement is extremely sensitive to the mirror alignment, and particularly to any degree of tilt in the toric mirror. Substitution of a corner cube mirror or a conic mirror for the toric mirror is sometimes made in an attempt to reduce this effect. In both cases, incident light in the annular beam is reflected from one side of the corner cube or conic reflector to the opposite side before being reflected back along the cavity. This poses a very serious polarization problem, in that the polarization of the light is scrambled by the conic or corner cube surface. A waxicon also inherently scrambles polarization, and it was ultimately discovered that the only practical modes of operation of the HSURIA configuration were either radially or tangentially polarized. As a result, the light beam out-coupled from the resonator tends to be self-cancelling at the optical axis. This, of course, is contrary to the normally desired far-field pattern of light generated by a high-power laser.

One solution to the polarization problem is to coat the toric elements of the resonator with special phase-shifting coatings, such that no net polarization shift is produced in a round-trip passage through the resonator. However, the use of coatings tends to aggravate manufacturing problems, since the optical elements have to be made to an extremely fine tolerance. In particular, the apex of the inner conical surface of the waxicon or reflaxicon may not be truncated without losing mode control of the device.

An alternative form of the basic HSURIA configuration described above is the traveling-wave or ring resonator version. Instead of a plane toric or conic rear mirror, another axicon is used to compact the annular beam and direct it to the scraper mirror.

Conventional annular optical resonators, typified by all forms of the HSURIA configuration, operate with less than a desired extraction efficiency, due to appreciable diffractive losses, as well as insufficient saturation of the gain medium. Moreover, the beam quality of the extracted radiation, as measured by the far-field radiation pattern, is not acceptable because of discrimination against higher order resonator modes. Accordingly, there is a need for an annular laser resonator configuration that addresses these problems. In particular, what is needed is an annular resonator providing improved laser power extraction efficiency with good far-field beam quality, and preferably no polarization problems. The present invention is directed to this end.

SUMMARY OF THE INVENTION

The present invention resides in a high-power laser resonator structure that combines the advantages of high extraction efficiency, good beam quality, and elimination or minimization of polarization problems. Basically, and in general terms, the structure of the invention comprises an axicon, a scraper mirror, and a rear mirror system. The axicon has an outer conical reflector element positioned to receive and transmit an annular beam passing through an annular gain region, and an inner conical reflector element coaxial with the outer element. The scraper mirror is generally coaxial with the axicon, and functions to receive light from the inner axicon element and to reflect a feedback beam back to the inner element, while allowing an out-coupled beam to pass out of the resonator. The rear mirror system operates to evert a received annular beam and reflect it back along an annular path. In other words, each inner ray of the received annular beam is reflected by the rear mirror system as an outer ray of the reflected annular beam. Similarly, each outer ray of the received beam is reflected as an inner ray.

The inner conical reflector element of the axicon is positioned to intercept and compact only a portion of the beam reflected from the outer conical reflector element of the axicon. The remaining portion of the beam that is not intercepted, passes diametrically across the outer conical reflector element and makes two further passes through the gain region before being intercepted and compacted by the inner conical reflector element.

An important feature of the resonator configuration of the invention is that the optical axis of every light beam within the resonator is substantially at the beam center. This is true of the compacted out-coupled beam, the feedback beam, a radially directed beam between the axicon elements, the annular beam passing through the gain region, and beams with radial components in the rear mirror system. Another way of defining the position of the inner axicon element is that its conical apex is positioned on the optical axis of the radial beam directed across the outer conical element from one point to a diametrically opposite point.

The axicon in the structure of the invention can be either a waxicon or a reflaxicon. The optics of the invention for these two cases vary only slightly, in that the scraper mirror is positioned inside the cylinder formed by the gain region if a waxicon is used. If a reflaxicon is used, the scraper mirror can be positioned well clear of the gain region and is easier to support.

The rear mirror system can take one of several forms in accordance with different embodiments of the invention. In one form, the system comprises a conical mirror and a planar rear mirror. The received annular beam is reflected from the conic mirror to the plane mirror, which is centrally positioned with its surface perpendicular to the axis of symmetry of the device, and then from the opposite side of the conic mirror. The result is that the annular beam is everted. The inner half of the beam impinging on the rear mirror system is reflected back along the outer half of the annular path. Similarly, the outer half of the impinging annular beam is reflected back along the inner half of the annulus. Stated another way, the annular beam is inverted about its optical axis. An important property of the rear mirror system of the invention is that it does not affect the polarization state of the beam.

Another form of the rear mirror system is a concave retroreflecting cone. This is basically a concavely curved, roughly cone-shaped mirror. The function of this rear mirror system is the same as that of the cone and planar mirror combination. The annular beam is reflected back along its annular path, but with inner and outer portions reversed.

In yet another embodiment, the rear mirror system includes a concave conical mirror in combination with a convex end mirror having a central hole to alleviate problems relating to plasma breakdown due to a high concentration of energy at the optical axis. In this embodiment, the outer element of the axicon has two distinct sub-elements: a first sub-element positioned to receive one portion of the annular beam and reflect it to the inner element of the axicon for compaction, and a second sub-element positioned to receive the other portion of the annular beam, and reflect it across the outer axicon element and back along the same portion of the annular beam path. This arrangement reduces the possibility of excessive flux loading at the center of the inner conical element, which is fabricated as a blunt tip rather than a sharp one. The blunt inner element not only alleviates flux loading difficulties at the apex of the cone, but also reduces the difficulty of coating the inner element. The rear mirror and the outer conical mirror in this embodiment are contoured to alleviate the flux loading that would be otherwise imposed on the rear mirror.

It will be appreciated from the foregoing that the present invention represents a significant advance in the field of annular lasers. In particular, the invention provides an annular standing-wave cavity configuration with high energy extraction efficiency, good beam quality, and virtually no polarization problems. The high energy extraction efficiency arises from the geometry of the annular configuration, which provides for four passes through the gain region, between feedback from the scraper mirror and availability for out-coupling. Other aspects and advantages of the invention will become apparent from the following more detailed description, taken in conjunction with the accompanying drawings.

DESCRIPTION OF THE PREFERRED EMBODIMENTS

Figure 1:
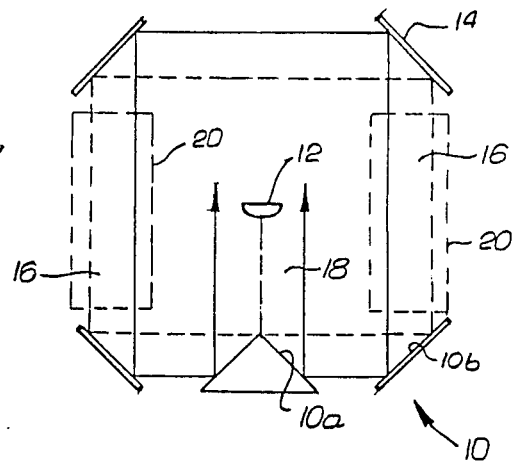
FIG. 1 is a schematic view of a standing-wave half-symmetrical unstable resonator with an internal axicon (HSURIA), known in the prior art.

As shown in the drawings for purposes of illustration, the present invention is concerned with improvements in standing-wave annular resonators for use in high-power lasers. Annular configurations are needed to obtain high power outputs from lasers, such as chemical lasers. An important advantage of annular lasers is that, since reacting gases are flowed uniformly in all radial directions, reactive forces acting on the laser structure are self-cancelling.

FIG. 1 shows a typical standing-wave resonator of the prior art, known as the half-symmetrical unstable resonator with internal axicon (HSURIA). The resonator includes waxicon compactor, indicated generally by reference numeral 10, a scraper mirror 12, and a rear conic mirror 14. The waxicon 10 has an inner conical mirror 10a and an outer conical mirror 10b coaxial with the inner one but having an opposite angle of inclination. In the cross-sectional view as shown, the surfaces of the inner and outer conical mirrors 10a and 10b form the letter W; hence the name w-axicon, or waxicon. The waxicon 10 functions to compact an annular beam 16 impinging on the outer mirror 10b into a cylindrical beam 18 travelling in the opposite direction. The cylindrical beam 16 impinges on the scraper mirror 12, which is positioned coaxially with respect to the waxicon 10 and the rear mirror 14. Part of the cylindrical beam 16 passes around the scraper mirror 12 and is coupled out of the resonator. A central portion of the beam 16, however, is reflected by the scraper mirror in a slightly divergent manner, due to the convex curvature of the scraper mirror 12. This is the feedback beam from the scraper mirror 12. The feedback beam is expanded by the waxicon 10, and transmitted as a generally annular beam through an annular gain region 20 of the device. Upon reaching the conic rear mirror 14, the annular beam 16 is everted by the action of the rear mirror, and retransmitted through the gain region 20. It will be observed that a ray of light in the feedback beam from the scraper mirror 12 makes just two passes through the gain region 20 before being available for out-coupling from the resonator.

Figure 2:
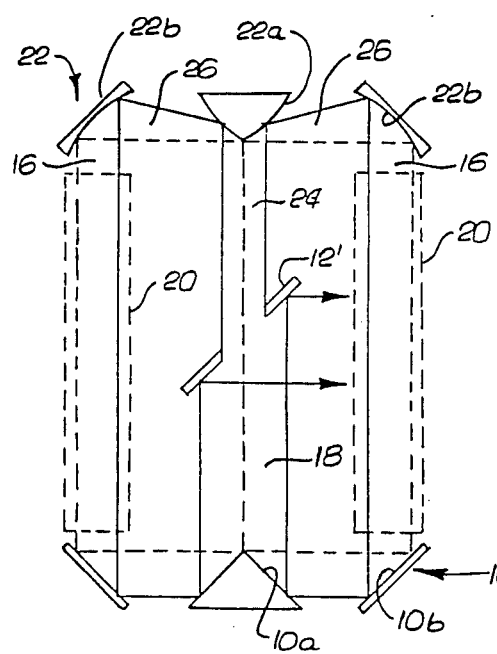
FIG. 2 is a schematic view of a traveling-wave version of the HSURIA shown in FIG. 1.

The traveling-wave counterpart to the HSURIA configuration of FIG. 1 is shown in FIG. 2. This also includes a waxicon, indicated at 10, an annular scraper mirror 12', and another waxicon 22 instead of the conic mirror 14 of FIG. 1. In this version, the compacted cylindrical beam 18 impinges on the scraper mirror 12', which is inclined to the optical axis of the beam. An annular portion of the beam 18 is reflected from the scraper mirror 12' and is out-coupled from the resonator. A central remaining portion 24 of elliptical cross section passes through the scraper mirror 12' and constitutes the feedback beam. The feedback beam 24 impinges on the inner mirror 22a of the second waxicon 22. The inner mirror 22a is convexly curved to provide a slightly divergent radial beam 26, and the outer mirror 22b is concavely curved to reflect the radial beam along an annular path through the gain region 20. The most significant factor affecting the energy extraction efficiency of a resonator is the number of passes that a light ray must make through the gain medium before becoming available for out-coupling. In the FIG. 2 configuration, a light beam near the outer edge of the feedback beam 24 will be outcoupled after only one additional pass through the gain region 20. Rays nearer the center of the feedback beam 24 will pass through the gain region 20 two or more times, depending on the beam magnification factor provided by the waxicon 22. In any event, a significant portion of the energy of the feedback beam 24 will be out-coupled after only one pass, and another portion will be outcoupled after two passes. For this reason, the efficiency of extraction of energy from the gain region is relatively low.

Another significant feature of the HSURIA configurations is that, although the optical axis of the compacted beam 18 is at its center, the optical axis of the radial and annular beams is at one edge of the beam, as shown by the broken lines in FIGS. 1 and 2.

Figure 3:
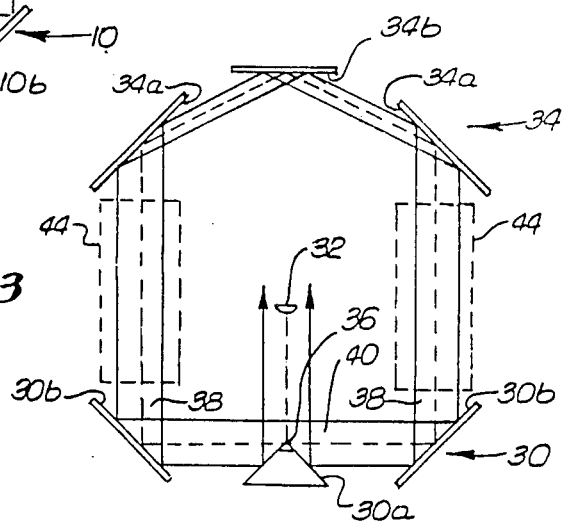
FIG. 3 is a schematic view of a high extraction efficiency annular resonator in accordance with the present invention, using a waxicon for beam compaction.

In accordance with the invention, a standing-wave resonator provides at least four passes through the gain region before making a beam available for out-coupling. The structure of the invention, as shown in FIG. 3, includes an axicon 30, which by way of example is shown as a waxicon, a scraper mirror 32, and a rear mirror system 34. The waxicon 30 includes an inner conical mirror 30a and an outer conical mirror 30b. A critical feature of the invention is that the inner mirror 30a is positioned such that its apex point 36 is offset from the normal position for a waxicon. An annular beam propagating along path 38 and impinging on the outer mirror 30b is reflected inwardly along a radial path 40. However, only approximately the lower half of this radial beam impinges on the inner mirror 30a. The upper half of the radial beam on path 40 passes over the apex point 36 and impinges on the opposite face of the outer mirror 30b, to be reflected again as an annular beam.

Another critical element of the novel configuration is the rear mirror system 34. In the embodiment of FIG. 3, this includes a conical mirror 34a and a plane rear mirror 34b centrally positioned in a perpendicular relationship with the axis of symmetry of the resonator structure. When a beam propagating along the annular path 38 impinges on the conical mirror 34a, light is reflected with both radial and axial components onto the plane mirror 34b. From the plane mirror 34b, light is again reflected to the opposite side of the conical mirror 34a, and from there is reflected as a return beam along the annular path 38. However, the return beam has been effectively inverted about its optical axis by reflection at the three reflecting surfaces of the rear mirror system 34. The inner half of an annular beam impinging on the rear mirror system 34 is reflected from the system in the position of the outer half, and vice versa.

An important feature of the invention is that the optical axis of the beam remains at the center of each beam path in the resonator. As shown by the broken lines in FIG. 3, the optical axis is at the center of the radial path 40 and at the center of the annular path 38. This position of the optical axis substantially reduces the diffractive losses that are inherent in the configurations of FIGS. 1 and 2.

The annular path 38 passes through an annular gain region, indicated at 44, and the principal advantage of the invention results from the number of passes that are made through the gain region in this configuration. Light reflected from the scraper mirror 32 as a feedback beam is reflected from the inner mirror 30a, along the lower half of the radial path 40. Light in this path impinges on the outer mirror 30b, which reflects the beam along the inner half of the annular path 38, for a first pass through the gain region 44. After reflection by the rear mirror system 34, a second pass is made through the gain region 44, along the outer half of the annular path 38. Flux propagating in this half of the annular path 38 is reflected by the outer waxicon mirror 30b, but bypasses the inner waxicon mirror 30a. After a second reflection by the outer waxicon mirror 30b, the beam returns to the rear mirror system 34 along the outer half of the annular path 38, making a third pass through the gain region 44. The rear mirror system 34 reflects this beam along the inner half of the annular path 38, making a fourth pass through the gain region 44. Finally, the waxicon 30 compacts the beam and a portion of it is out-coupled around the scraper mirror 32. It will be observed by tracing these paths in FIG. 3 that, because of the offset position of the apex point 36, light will make at least four passes through the gain region 44 before becoming available for out-coupling. This provides a significantly increased efficiency of energy extraction from the gain region.

Figure 4:
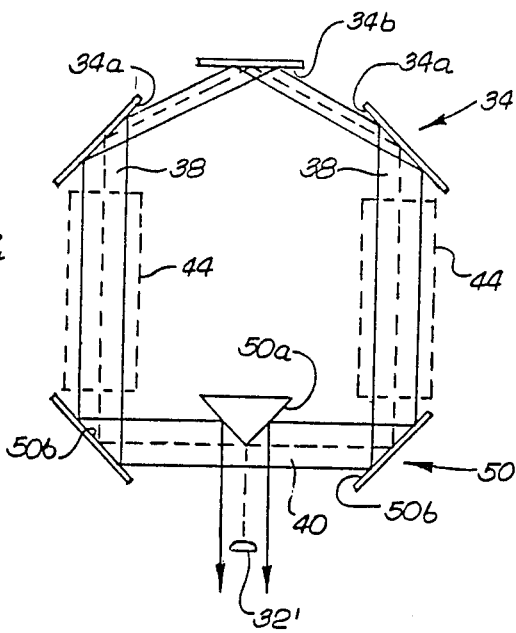
FIG. 4 is a schematic view of another embodiment of the resonator of the invention, using a reflaxicon instead of a waxicon for beam compaction.

FIG. 4 shows another embodiment of the invention, in which a reflaxicon 50 is used for beam compaction, and the scraper mirror 32' is located well clear of the gain region 44. As in the FIG. 3 version, the reflaxicon 50 has an inner conical mirror 50a that is offset to allow a portion of the flux in the radial path 40 to bypass the inner mirror. Again, the optical axis of the several beams in the resonator is always at the beam center.

Figure 5:
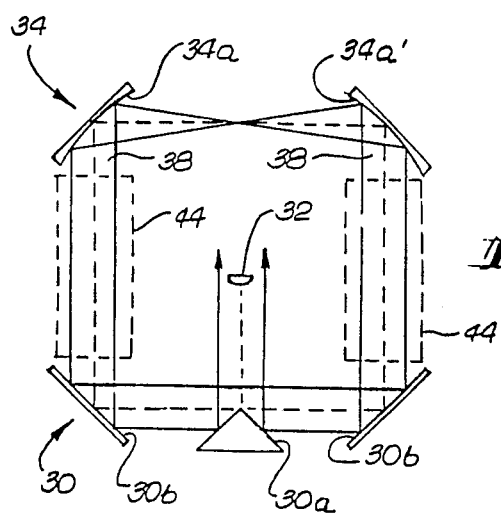
FIG. 5 is a schematic view of another embodiment of the resonator of the present invention, using a concave retroreflecting cone as the rear mirror system.

FIG. 5 shows yet another embodiment of the invention, in which the rear mirror system 34 includes only a single concave reflecting cone 34a'. The concave curvature of the mirror 34a' performs the same inversion function as the cone and planar mirrors 34a and 34b in the FIG. 3 embodiment.

Figure 6:
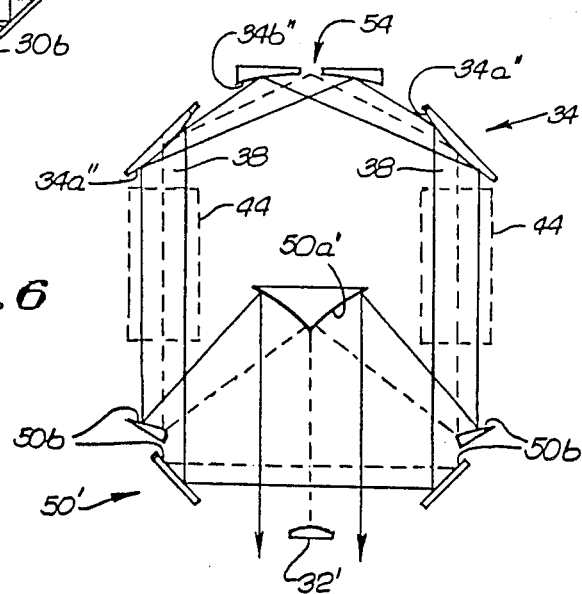
FIG. 6 is a schematic view of yet another embodiment of the resonator of the present invention.

Another preferred embodiment of the invention is shown in FIG. 6. The rear mirror system 34 in this embodiment includes a convex conical mirror 34a'' and a single back concave mirror 34b''. The back mirror 34b'' has a small central hole 54 at the location of the optical axis. The line focus that would otherwise occur at this point on the mirror surface is instead directed to a point in free space. The hole 54 can also serve as an access port if gas flow conditioning is required to further discourage gas breakdown in the region of the line focus. The contours of the surfaces of the rear mirror system 34 provide internal beam expansion, to further reduce the energy flux on the back mirror 34b''.

The axicon in this embodiment, illustrated as a reflaxicon 50', is configured to reduce the exposure of the tip of the inner mirror 50a' to excessive flux. Specifically, the inner mirror 50a' is concavely contoured to provide internal beam expansion, and the apex of the cone is slightly rounded. In addition, the outer mirror 50b' is segmented into two parts, one of which is aligned with only the outer half of the annular beam, and the other of which is aligned with only the inner half of the annular beam. The outer segment of the outer mirror 50b' is convexly contoured to provide beam expansion or contraction to compensate for the concave contour of the inner mirror 50a'. The inner segment of the outer mirror 50b' is a corner cube mirror for reflecting the inner half of the annular beam back on itself using three reflections.

The modified reflaxicon 50' differs from the reflaxicon 50 of FIG. 4 in one important respect. Use of the corner cube instead of a conical mirror in reflecting the the inner annular portion of the beam back on itself avoids polarization of the beam. The conical mirror inherently suffers from a polarization mixing problem. The corner cube, which uses three reflections instead of two, avoids this problem.

It will be appreciated form the foregoing that the present invention represents a significant advance in the field of high-energy lasers. Specifically, the invention overcomes several problems inherent in prior annular resonator configurations. In summary, the invention provides a higher energy extraction efficiency, as a result of locating the optical axis midway within the optical gain region and offsetting the position of the inner axicon element. The optical diffraction losses are thereby reduced, but the number of times that the intracavity flux passes through the gain region is increased. Beam quality is also improved, by more effective discrimination against higher order resonator modes whose farfield intensity distributions are less desirable than that of the lowest order mode. This mode discrimination is a result of effective saturation of the gain medium, which lends itself to higher geometric output coupling from the resonator. Moreover, the rear mirror system of the present invention is not polarization sensitive, and consequently does not compromise the optical beam quality of the device.

It will also be appreciated that, although a number of embodiments of the invention have been described in detail for purposes of illustration, various modifications may be made without departing from the spirit and scope of the invention. Accordingly, the invention is not to be limited except as by the appended claims.

I claim:

1. An annular resonator for a high-energy laser, the resonator having high extraction efficiency, and comprising:

an axicon having coaxial outer and inner conical reflector elements, the outer conical reflector element being positioned to receive an annular beam passing through an annular gain region and to reflect the annular beam toward the inner element as a generally radial beam;

a scraper mirror coaxial with the axicon, for receiving a cylindrical beam from the inner conical reflector element, reflecting a feedback beam back to the inner conical reflector element, and for allowing an out-coupled beam to pass out of the resonator; and a rear mirror system, for everting a received annular beam received from the axicon and reflecting it back along an annular path, the rear mirror system also including means for inverting the received annular beam about its optical axis, such that the outermost rays in the annular beam received from the axicon are reflected as the innermost rays, and vice versa;

and wherein the inner conical reflector element is positioned to intercept and compact no more than about half of the radial beam reflected from the outer conical reflector element, wherein the remaining portion not intercepted passes diametrically across the outer conical reflector element and makes two further passes through the gain region before being intercepted and compacted by the inner conical reflector element, and wherein light in the feedback beam makes a total of at least four passes through the gain region before becoming available for out-coupling from the resonator.

2. An annular resonator as set forth in claim 1, wherein:
the axicon is a waxicon.

3. An annular resonator as set forth in claim 1, wherein:
the axicon is a reflaxicon.

4. An annular resonator as set forth in claim 1, wherein:
the rear mirror system includes a conical mirror and a symmetrically located plane back mirror, whereby an annular beam is reflected first from the conical mirror, then from the plane mirror, and finally from the conical mirror again, to emerge as an everted annular beam.

5. An annular resonator as set forth in claim 2, wherein:
the rear mirror system includes a conical mirror and a symmetrically located plane back mirror, whereby an annular beam is reflected first from the conical mirror, then from the plane mirror, and finally from the conical mirror again, to emerge as an everted annular beam.

6. An annular resonator as set forth in claim 3, wherein:
the rear mirror system includes a conical mirror and a symmetrically located plane back mirror, whereby an annular beam is reflected first from the conical mirror, then from the plane mirror, and finally from the conical mirror again, to emerge as an everted annular beam.

7. An annular resonator as set forth in claim 2, wherein:
the rear mirror system includes a concave retroreflecting cone.

8. An annular resonator as set forth in claim 3, wherein:
the rear mirror system includes a convexly curved conical mirror and a concavely curved, symmetrically located back mirror with a hole in its center to alleviate line focus problems; and
the reflaxicon includes an inner concavely curved conical mirror, an outer convexly curved conical mirror positioned to reflect an outer portion of an annular beam to the inner conical mirror, and a corner cube mirror positioned to retroreflect the inner portion of the annular beam back on itself without polarization mixing;
whereby the curvature of the rear mirror system elements and the inner and outer mirrors of the reflaxicon minimize the adverse effects of intensely focused energy.

9. A standing-wave annular resonator for a high-energy laser, the resonator having high extraction efficiency, and comprising:
an axicon having an outer element for converting between annular and radial beam configurations, and an inner element positioned to receive no more than about half of a radial beam from the outer element, the remainder of the radial beam passing diametrically across the inner element and impinging on the outer element again, the inner element operating to convert between radial and cylindrical beam configurations;
a scraper mirror coaxial with the axicon, for out-coupling a portion of a cylindrical beam from the axicon, and reflecting another portion back to the axicon as a feedback beam;
an annular gain region through which an annular beam from the axicon passes;
rear mirror retroreflecting means, for receiving the annular beam and reflecting it as an everted beam, the rear mirror retroreflecting means also including means for inverting the received annular beam about its optical axis, such that the outermost rays in the annular beam received from the axicon are reflected as the innermost rays, and vice versa;
wherein light from the feedback beam makes two passes through the gain region, then bypasses the inner element of the axicon, and makes two additional passes through the gain region, for a total of at least four passes through the gain region before being again reflected by the inner element of the axicon and becoming available for out-coupling from the resonator.

10. A standing-wave annular resonator as set forth in claim 9, wherein:
the axicon is a waxicon.

11. An annular resonator as set forth in claim 9, wherein:
the axicon is a reflaxicon.

12. A standing-wave annular resonator as set forth in claim 9, wherein:
the rear mirror retroreflecting means includes a conical mirror and a symmetrically located plane back mirror, whereby an annular beam is reflected first from the conical mirror, then from the plane mirror, and finally from the conical mirror again, to emerge as an everted annular beam.

13. A standing-wave annular resonator as set forth in claim 10, wherein:
the rear mirror retroreflecting means includes a conical mirror and a symmetrically located plane back mirror, whereby an annular beam is reflected first from the conical mirror, then from the plane mirror, and finally from the conical mirror again, to emerge as an everted annular beam.

14. A standing-wave annular resonator as set forth in claim 11, wherein:
the rear mirror retroreflecting means includes a conical mirror and a symmetrically located plane back mirror, whereby an annular beam is reflected first from the conical mirror, then from the plane mirror, and finally from the conical mirror again, to emerge as an everted annular beam.

15. A standing-wave annular resonator as set forth in claim 11, wherein:
the rear mirror retroreflecting means includes a concave retroreflecting cone.

16. A standing-wave annular resonator as set forth in claim 11, wherein:
- the rear mirror retroreflecting means includes a convexly curved conical mirror, symmetrically located back mirror with a hole in its center to alleviate line focus problems; and
- the reflaxicon includes an inner concavely curved conical mirror, an outer convexly curved conical mirror positioned to reflect an outer portion of an annular beam to the inner conical mirror, and a corner cube mirror positioned to retroreflect the inner portion of the annular beam back on itself without polarization mixing;
- whereby the curvature of the rear mirror system elements and the inner and outer mirrors of the reflaxicon minimize the adverse effects of intensely focused energy.

* * * * *